United States Patent
Wada et al.

(10) Patent No.: US 9,543,767 B2
(45) Date of Patent: Jan. 10, 2017

(54) PARALLEL ELECTRICITY-STORAGE SYSTEM AND CONTROL METHOD THEREOF

(75) Inventors: Toshihiro Wada, Chiyoda-ku (JP); Hisanori Yamasaki, Chiyoda-ku (JP); Keita Hatanaka, Chiyoda-ku (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 229 days.

(21) Appl. No.: 14/377,357

(22) PCT Filed: Feb. 9, 2012

(86) PCT No.: PCT/JP2012/052961
§ 371 (c)(1),
(2), (4) Date: Aug. 7, 2014

(87) PCT Pub. No.: WO2013/118271
PCT Pub. Date: Aug. 15, 2013

(65) Prior Publication Data
US 2015/0002095 A1    Jan. 1, 2015

(51) Int. Cl.
*H02J 7/00* (2006.01)
*B60L 11/18* (2006.01)

(52) U.S. Cl.
CPC .............. *H02J 7/0021* (2013.01); *H02J 7/007* (2013.01); *H02J 7/0013* (2013.01); *H02J 7/0068* (2013.01);
(Continued)

(58) Field of Classification Search
CPC ........ H01M 10/44; H02J 7/008; H02J 7/0013; Y02T 10/7126
(Continued)

(56) References Cited

U.S. PATENT DOCUMENTS 4,616,171 A * 10/1986 Hernandez ............ H02J 7/0042
320/142
6,262,494 B1    7/2001 Tsukuni et al.
(Continued)

FOREIGN PATENT DOCUMENTS

EP    1 837 944 A2    9/2007
EP    2 557 654 A2    2/2013
(Continued)

OTHER PUBLICATIONS

The extended European Search Report issued on Oct. 22, 2015, by the European Patent Office in corresponding European Patent Application No. 12867932.1-1804 (6 pgs).
(Continued)

*Primary Examiner* — Paul Dinh
(74) *Attorney, Agent, or Firm* — Buchanan Ingersoll & Rooney PC (57) ABSTRACT

The present invention relates to a parallel electricity-storage system that includes: a plurality of DC buses; a number of sets of battery banks formed by serially connecting one or a plurality of battery cells capable of charging and discharging, the number thereof being larger than number of the DC buses; a switch provided for each of the battery banks and serially connected to the battery bank to switch connection between the battery bank and each of the DC buses; charge/discharge circuits as many as the number of the DC buses that charge the respective battery banks via the DC buses or supply discharged power from the respective battery banks received via the DC buses to a load device; a voltage detector that detects a voltage of the respective battery banks; and a controller that controls the switch based on at least a voltage detected by the voltage detector.

8 Claims, 8 Drawing Sheets

(52) U.S. Cl.
CPC ........... *B60L 11/1855* (2013.01); *H02J 7/0024* (2013.01); *H02J 2007/0067* (2013.01)

(58) Field of Classification Search
USPC ......... 320/116, 124–125, 127, 140, 149–152
See application file for complete search history.

(56) References Cited

U.S. PATENT DOCUMENTS

| | | | |
|---|---|---|---|
| 6,304,059 B1* | 10/2001 | Chalasani | H02J 7/0018 320/118 |
| 2006/0267551 A1* | 11/2006 | Sutardja | H02J 7/0013 320/116 |
| 2009/0278488 A1* | 11/2009 | Choi | H02J 7/0016 320/103 |
| 2010/0038962 A1 | 2/2010 | Komatsu | |
| 2010/0123433 A1* | 5/2010 | Guo | H01M 10/441 320/118 |
| 2010/0207579 A1* | 8/2010 | Lee | H02J 7/0018 320/120 |
| 2011/0089763 A1 | 4/2011 | Svensson et al. | |
| 2011/0089898 A1* | 4/2011 | Lee | H02J 7/0016 320/116 |
| 2011/0187313 A1* | 8/2011 | Lee | H02J 7/04 320/107 |
| 2011/0266875 A1 | 11/2011 | Shimura et al. | |
| 2011/0285352 A1* | 11/2011 | Lim | H02J 7/0019 320/118 |
| 2013/0002026 A1 | 1/2013 | Mizutani et al. | |
| 2013/0106356 A1* | 5/2013 | Nakao | B60L 11/1864 320/118 |

FOREIGN PATENT DOCUMENTS

| | | |
|---|---|---|
| JP | 11-273747 A | 10/1999 |
| JP | 2002-034157 A | 1/2002 |
| JP | 2004-147477 A | 5/2004 |
| JP | 2008-118790 A | 5/2008 |
| JP | 2008-167620 A | 7/2008 |
| JP | 2009-033936 A | 2/2009 |
| JP | 2010-029015 A | 2/2010 |
| JP | 2010-172143 A | 8/2010 |
| JP | 2011-055592 A | 3/2011 |
| JP | 2011-177025 A | 9/2011 |
| WO | 2009/155986 A1 | 12/2009 |

OTHER PUBLICATIONS

International Search Report (PCT/ISA/210) mailed on Nov. 6, 2012, by the Japanese Patent Office as the International Searching Authority for International Application No. PCT/JP2012/052961.

Written Opinion (PCT/ISA/237) mailed on Nov. 6, 2012, by the Japanese Patent Office as the International Searching Authority for International Application No. PCT/JP2012/052961.

* cited by examiner

PARALLEL ELECTRICITY-STORAGE SYSTEM AND CONTROL METHOD THEREOF

FIELD

The present invention relates to a parallel electricity-storage system and a control method thereof.

BACKGROUND

Conventionally, for example, Patent Literature 1 discloses a technique of preventing occurrence of problems such as overcurrent and abnormal heat generation resulting from a large cross current at the time of parallel input, in a parallel-connected electricity-storage system in which one or a plurality of electricity storage elements capable of charging and discharging are serially connected to form an electricity-storage element array, and a plurality of electricity-storage element arrays are connected in parallel. In the parallel-connected electricity-storage system, a cutoff switch is provided in each electricity-storage element array, and when there is one or a plurality of electricity-storage element arrays in which a voltage difference detected by a voltage monitoring unit is within a predetermined value, only a switch corresponding to the electricity-storage element array is closed to prevent the occurrence of problems (see, for example, Patent Literature 1 mentioned below).

Patent Literature 2 discloses a secondary battery with units including unit cells and charge/discharge circuits serially connected, in which DC/DC converter operating as a charge/discharge circuit are provided for each unit cells; while discharging, an output current of the DC/DC converter connected to a unit cell having a high SOC is set to be larger than that of a unit cell having a low SOC, so that the variations in the SOC are decreased; and while charging, an output current of the DC/DC converter connected to a unit cell having a high SOC is set to be less than that of a unit cell having a low SOC, so that the variations in the SOC are decreased.

CITATION LIST

Patent Literatures

Patent Literature 1: Japanese Patent Application Laid-open No. 2009-33936
Patent Literature 2: Japanese Patent Application Laid-open No. 2011-55592

SUMMARY

Technical Problem

However, the technique disclosed in Patent Literature 1 mentioned above is for a parallel electricity-storage system having a low output, and is not suitable for a parallel electricity-storage system having a high output. Because the system disclosed in Patent Literature 1 needs to interrupt a current at the time of operating the switch; and when a relatively large current is interrupted, the entire system needs to be shut down at the time of operating the switch.

Patent Literature 2 mentioned above requires one DC/DC converter for each unit cell. Therefore, when the technique disclosed in Patent Literature 2 is applied to a parallel electricity-storage system having a high output in which a number of unit cells need to be connected in parallel for achieving a high output, the system becomes large in scale and more expensive.

The present invention has been achieved in view of the above aspects, and an object of the present invention is to provide a parallel electricity-storage system that can suppress the system from becoming large in scale and more expensive even when it is applied to a high-output system, and a control method thereof.

Solution to Problem

The present invention relates to a parallel electricity-storage system that includes: a plurality of DC buses; a number of sets of battery banks formed by serially connecting one or a plurality of battery cells capable of charging and discharging, the number thereof being larger than number of the DC buses; a switch provided for each of the battery banks and serially connected to the battery bank to switch connection between the battery bank and each of the DC buses; charge/discharge circuits as many as the number of the DC buses that charge the respective battery banks via the DC buses or supply discharged power from the respective battery banks received via the DC buses to a load device; a voltage detector that detects a voltage of the respective battery banks; and a controller that controls the switch based on at least a voltage detected by the voltage detector.

Advantageous Effects of Invention

According to the present invention, it is possible to suppress a system from becoming large in scale and more expensive even when it is applied to a high-output system.

DESCRIPTION OF EMBODIMENTS

Exemplary embodiments of a parallel electricity-storage system and a control method thereof according to the present invention will be explained below in detail with reference to the accompanying drawings. The present invention is not limited to the embodiments described below.

Figure 1:
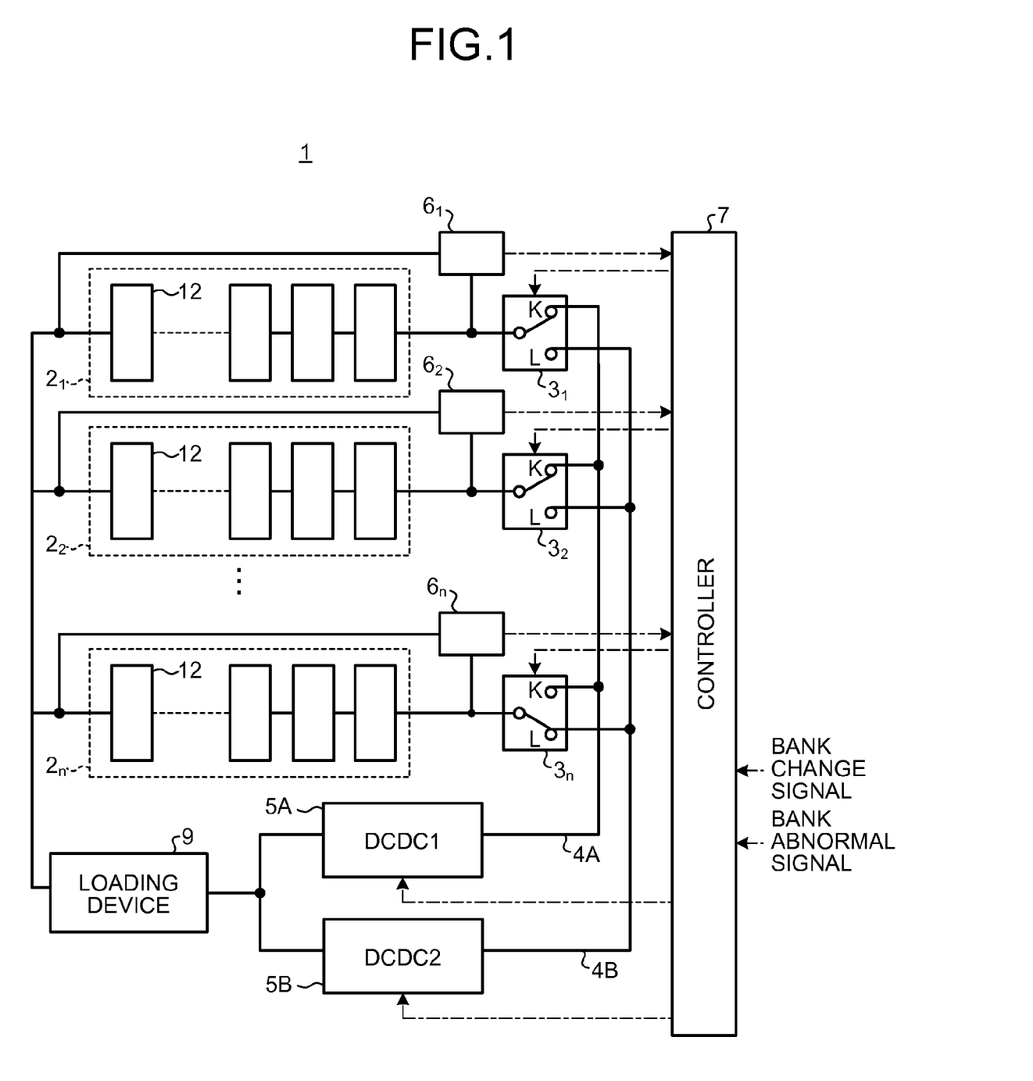
FIG. 1 is a block diagram illustrating a configuration of a parallel electricity-storage system.

FIG. 1 is a block diagram illustrating a configuration of a parallel electricity-storage system according to an embodiment of the present invention. As shown in FIG. 1, a parallel electricity-storage system 1 according to the present embodiment includes n sets of battery banks 2 ($2_2$, $2_2$, . . . , $2_n$) in which one or a plurality of battery cells 12 capable of charging and discharging are serially connected;

buses 4A and 4B respectively forming first and second DC buses; single-pole double-throw switches 3 ($3_1, 3_2, \ldots, 3_n$) provided for each of the battery banks 2 and serially connected to each battery bank 2 to switch connection between each battery bank 2 and the buses 4A and 4B; a DC-DC converter 5A as a first charge/discharge circuit electrically connected to a first contact K-side of the respective switches 3 via the bus 4A to charge the respective battery banks 2 or to supply discharged power from the respective battery banks 2 to a load device 9; a DC-DC converter 5B as a second charge/discharge circuit electrically connected to a second contact L-side of the respective switches 3 via the bus 4B to charge the respective battery banks 2 or to supply discharged power from the respective battery banks 2 to the load device 9; voltage detectors 6 ($6_1, 6_2, \ldots, 6_n$) that detect a voltage of the respective battery banks 2; and a controller 7 that controls operations of the DC-DC converters 5A and 5B based on detection values of the respective voltage detectors 6 and a predetermined signal (a bank change signal and a bank abnormal signal are exemplified in FIG. 1).

Additional explanations of the configuration of the parallel electricity-storage system according to the present embodiment will be given below. The number of DC-DC converters and the number of buses are the same. Accordingly, when the number of DC-DC converters is m (m is an integer of 2 or more), the number of buses is m and the switch 3 is a single-pole m-throw switch. Meanwhile, the number of DC-DC converters is less than the number of sets of battery banks n. That is, the number of sets of battery banks n and the number of DC-DC converters m hold a relation of m<n therebetween. For example, as shown in FIG. 1, when the system includes two DC-DC converters, two DC buses are provided and battery banks of three sets or more are connected thereto. When three DC-DC converters are provided, three DC buses are provided and battery banks of four sets or more are connected thereto.

The constituent elements of the load device 9, although not shown in FIG. 1, includes for example a smoothing capacitor that accumulates DC power, an inverter device that converts DC power to AC power, and an electric motor that drives a vehicle.

First to fifth methods as examples of a bank switch control applicable to the parallel electricity-storage system configured as shown in FIG. 1 are explained with reference to FIGS. 2 to 8.

(First Method)

Figure 2:
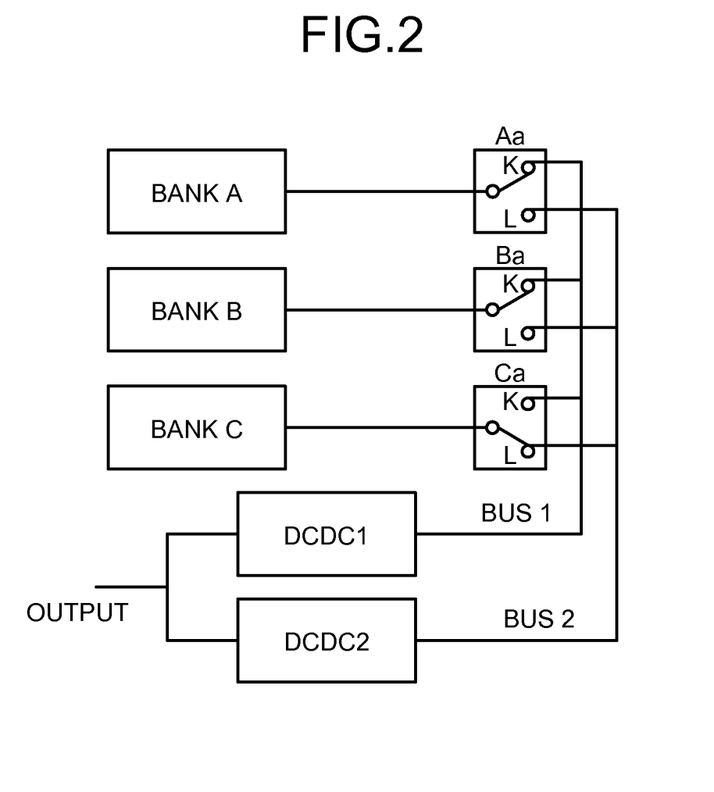
FIG. 2 is a simplified configuration diagram for explaining a first method.
Figure 3:
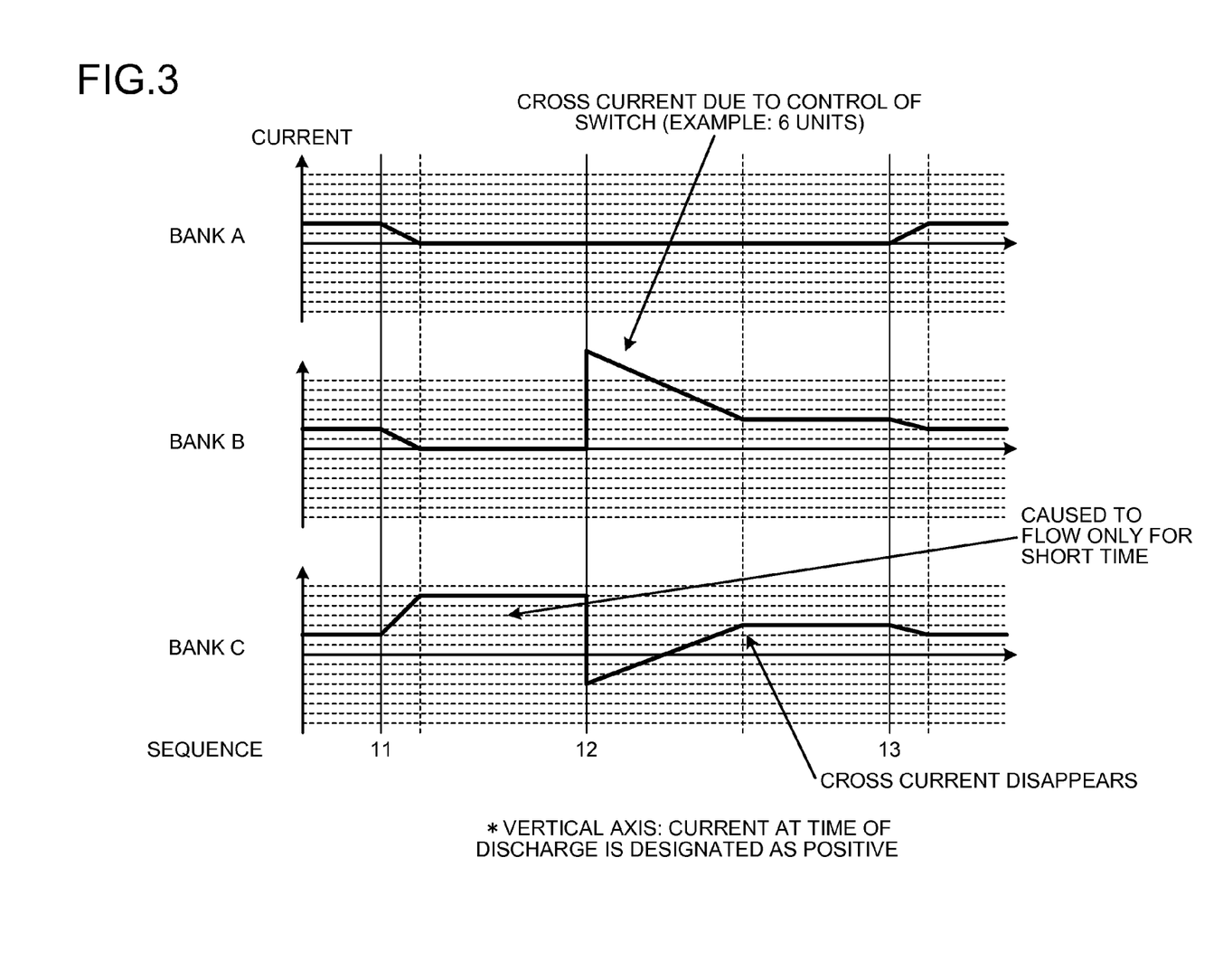
FIG. 3 is a time chart illustrating a state of respective banks according to the first method.

FIG. 2 is a simplified configuration diagram for explaining the first method according to the present embodiment. FIG. 3 is a time chart illustrating a state of the respective battery banks (hereinafter, simply "bank") according to the first method. In FIG. 2, in the configuration shown in FIG. 1, the number of sets of the banks 2 is three, and the number of DC-DC converters is two. Three banks are respectively denoted as "bank A", "bank B", and "bank C"; the two DC-DC converters 5A and 5B are respectively denoted as "DCDC1" and "DCDC2"; and the buses 4A and 4B are respectively denoted as "bus 1" and "bus 2".

As shown in FIG. 2, given that initial condition of the respective banks is

Bank A-bus 1 (contact K-side),
Bank B-bus 1 (contact K-side), and
Bank C-bus 2 (contact L-side).

The target condition for each banks is such that the bank B is switched to the bus 2-side (the banks A and C are kept as they are). Note that switching of the bank B to the bus 2-side is intended to group the banks in an similar state so as to connect to the same bus when, for example, the state of the bank B (a state defined by a charged state (SOC: State Of Charge), hours of use, a degradation state or the like, hereinafter, simply "state") becomes more similar to the state of the bank C rather than that of the bank A.

(1) First, the DCDC1 is shut down, and a current to the DCDC2 is increased to maintain an output of the system (sequence 11).

(2) A switch Ba is then switched to the bus 2 (the contact L) side (sequence 12). In the case of a switch not including a current cutoff function, cutoff of a large current is difficult, but closure of circuit is possible. In the case of the present example, because the DCDC1 is shut down, the switch Ba can be disconnected from the contact K. Furthermore, although the DCDC2 is operating, switching to the bus 2 can be performed because it is an closing operation to the contact L.

(3) Lastly, an output of the DCDC2 is decreased, and the output of the DCDC1 is increased to return to a normal operation mode (sequence 13).

In the sequence 11, to stop the operation of the DCDC1, a control to approximate the duty ratio of a switching signal with respect to a switching element (not shown), which is a constituent element of the DCDC1, to 0 only needs to be executed, for example (it is sufficient that the DCDC1 is regarded as being in a shutdown state, and the duty ratio does not always need to be 0).

Operations according to the first method are explained with reference to the time chart in FIG. 3. It is assumed that a scale shown by a dashed line is 1 unit, and the total amount of the current caused to flow to an output line is 6 units. The same applies to the following explanations. On this assumption, a balanced current (a current of 2 units) is flowing to the respective banks during a period until shifting to the sequence 11.

In the sequence 11, because the DCDC1 is shut down, the current of the banks A and B approaches to 0. Instead, the current of the bank C increases toward the dashed line of 6 units.

In the sequence 12, because the switch Ba is switched to the bus 2-side to connect the bank B to the bus 2, a rapid current shown in FIG. 3 flows to the bank B. In the example shown in FIG. 3, a discharge current of 9 units is flowing to the bank B, and a charge current of 3 units is flowing to the bank C (in total, the discharge current of 6 units). That is, at the time of switching connection of the bank B from the bus 1 to the bus 2, an interbank current, a so-called "cross current" is generated. The cross current decreases and disappears with a lapse of time. When the cross current disappears, the banks B and C share the current. Therefore, the discharge current of 3 units flows to both banks. Accordingly, the cross current of 6 units has flown by the connection switching of the bank B.

In the sequence 13, because the output of the DCDC2 is decreased and the output of the DCDC1 is increased, the current flowing to the bank A increases, and the current flowing to the banks B and C decreases. As a result, the banks A to C share the current, and the discharge current of 2 units flows from the respective banks.

As described above, according to the first method, a bank to be controlled is selected based on the state of the bank so as to switches the bank, associated with the control of the DC-DC converter, so that variations between the banks can be effectively adjusted without shutting down the system.

Sequences in a case where the number of buses and DC-DC converters are two have been explained by using the first method; however, the same sequences can be applied in a case where the number thereof is three or more. For example preferably, the operation of the first DC-DC converter, which is the DC-DC converter as a connection source electrically connected with the first battery bank to be switched, is stopped, and an operating current of at least one of the DC-DC converters other than the first DC-DC converter is increased to maintain the output of the system; the first switch connected with the first battery bank is then switched so as to be electrically connected to the DC-DC converter other than the first DC-DC converter; and the operating current of the DC-DC converters including the first DC-DC converter is returned to the state before having switched.

(Second Method)

Figure 4:
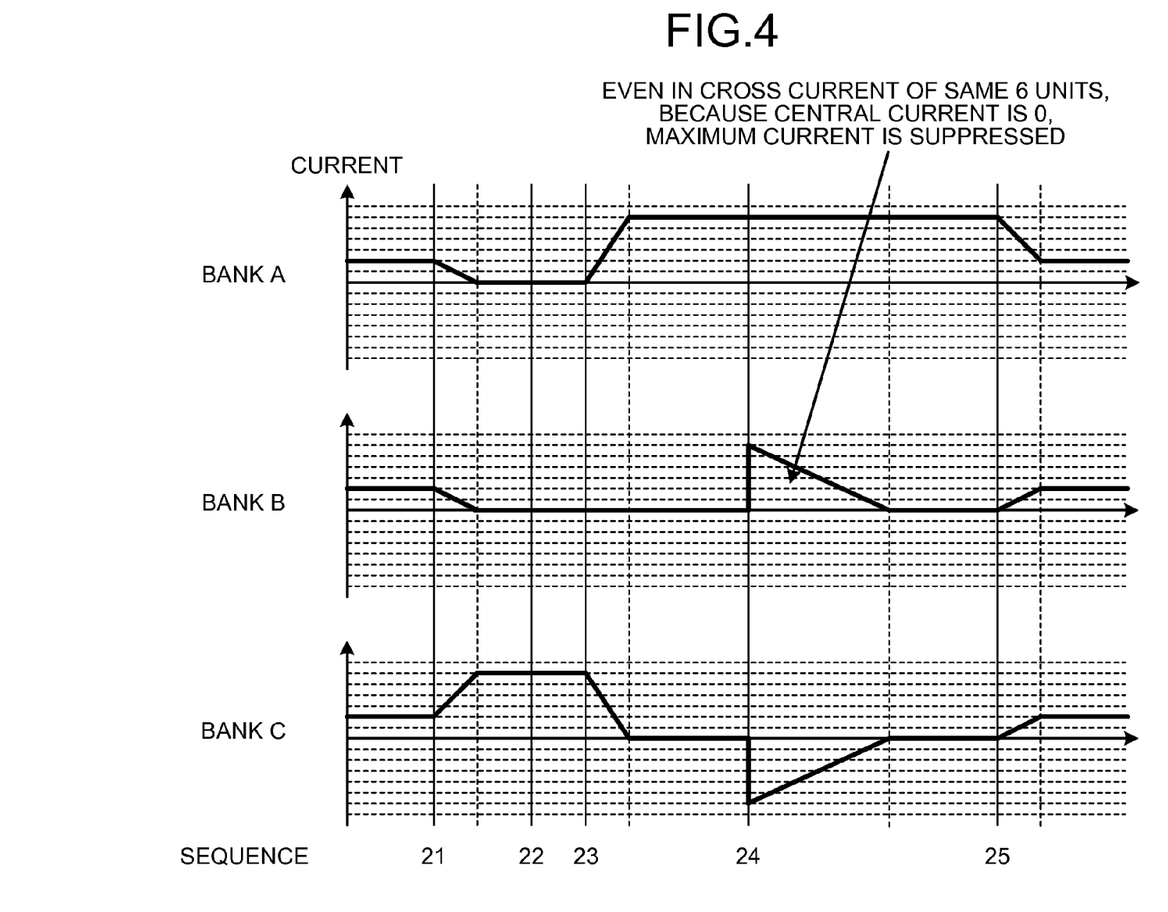
FIG. 4 is a time chart illustrating a state of respective banks according to a second method.

FIG. 4 is a time chart illustrating a state of respective banks according to a second method. In the second method, operations described below are performed. The system configuration is identical to that shown in FIG. 2.

(1) First, the DCDC1 is shut down, and the current to the DCDC2 is increased to maintain the output of the system (sequence 21).

(2) The switch Ba is then switched to a neutral position (a position where the switch Ba is not connected to either contact) (sequence 22).

(3) The DCDC2 is then shut down, and the current of the DCDC1 is increased so as to maintain the output of the system (sequence 23).

(4) The switch Ba is then switched to the bus 2 (the contact L) side to connect the bank 2 to the bus 2 (sequence 24).

(5) Lastly, the output of the DCDC2 is increased and the output of the DCDC1 is decreased, returning to the normal operation mode (sequence 25).

Operations according to the second method are explained with reference to the time chart in FIG. 4. In the sequence 21, because the DCDC1 is shut down, the current of the banks A and B approaches to 0. On the other hand, the current of the bank C increases toward the dashed line of 6 units.

In the sequence 22, the switch Ba is controlled to a neutral position, but because of the DCDC1 being shut down, there is no change in the states of the respective banks.

In the sequence 23, because the DCDC2 is shut down and the output of the DCDC1 is increased, the current flowing to the bank A increases, and the current flowing to the bank C decreases. As a result, the current of 6 units flows in the bank A, and the current in the bank C becomes not to flow.

In the sequence 24, because the switch Ba is connected to the bus 2, a rapid current as shown in FIG. 4 flows in the bank B. In the example shown in FIG. 4, a discharge current of 6 units is flowing in the bank B, and a charge current of 6 units is flowing in the bank C (note that the total current is 0). That is, even in the second method, a cross current of 6 units is generated as in the case of first method. However, in the case of the second method, even when the same cross current of 6 units flows, because the central current is 0, the maximum value of the current is suppressed as compared to the case of the first method in which the cross current of 9 units is generated. The cross current decreases and disappears with a lapse of time.

In the sequence 25, the output of the DCDC2 is increased and the output of the DCDC1 is decreased, so that the current flowing in the bank A decreases and the current flowing in the banks B and C increases. As a result, the banks A to C share the current, and a discharge current of 2 units resultantly flows to the respective banks.

As described above, according to the second method, switching of the bank is not instantly performed like in the procedure of the first method, but is performed after the switch has been operated into a neutral position, so that the cross current can be decreased than that in the first method, in addition to the effects derived from the first method.

According to the second method, the sequences in the case where the number of buses and DC-DC converters are two have been explained; however, the same sequences can be applied in the case where the number thereof is three or more. For example preferably, the operation of the first DC-DC converter, which is the DC-DC converter as the connection source electrically connected with the first battery bank to be switched, is stopped, and the operating current of at least one of the DC-DC converters other than the first DC-DC converter is increased to maintain the output of the system; the first switch connected with the first battery bank is then switched into a neutral position; the operation of the second DC-DC converter, which is the DC-DC converter as a switching destination, is stopped, and the operating current of at least one of the DC-DC converters other than the second DC-DC converter is increased to maintain the output of the system; the first switch is then switched so as to be electrically connected to the DC-DC converter other than the first DC-DC converter; and the operating current of the DC-DC converters including the first DC-DC converter is returned to the state before switching.

(Third Method)

Figure 5:
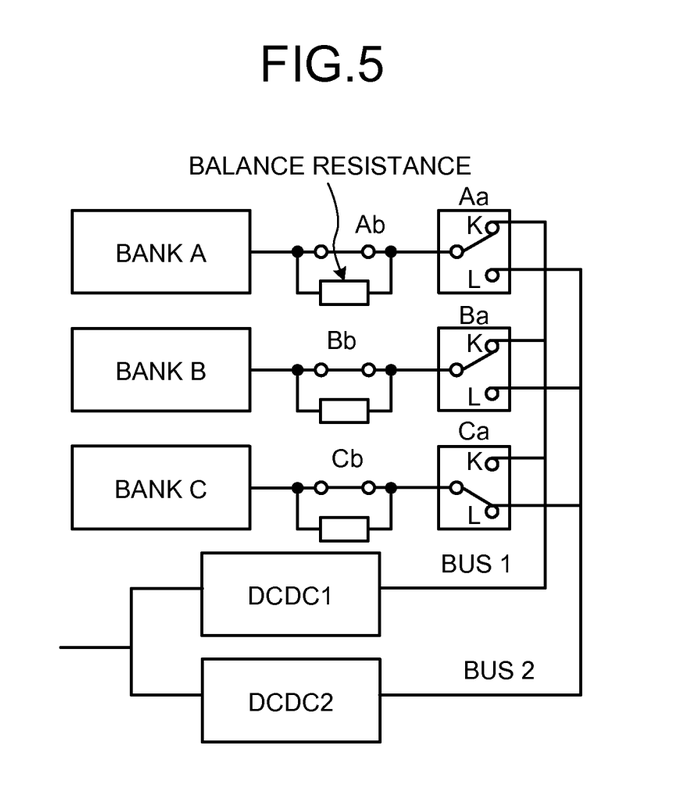
FIG. 5 is a simplified configuration diagram for explaining a third method.

FIG. 5 is a simplified configuration diagram for explaining a third method according to the present embodiment. In FIG. 5, opening/closing switches Ab, Bb, and Cb connected with a resistance in parallel are inserted between the respective banks and the respective switches. Other configurations are identical to those shown in FIG. 2.

Figure 6:
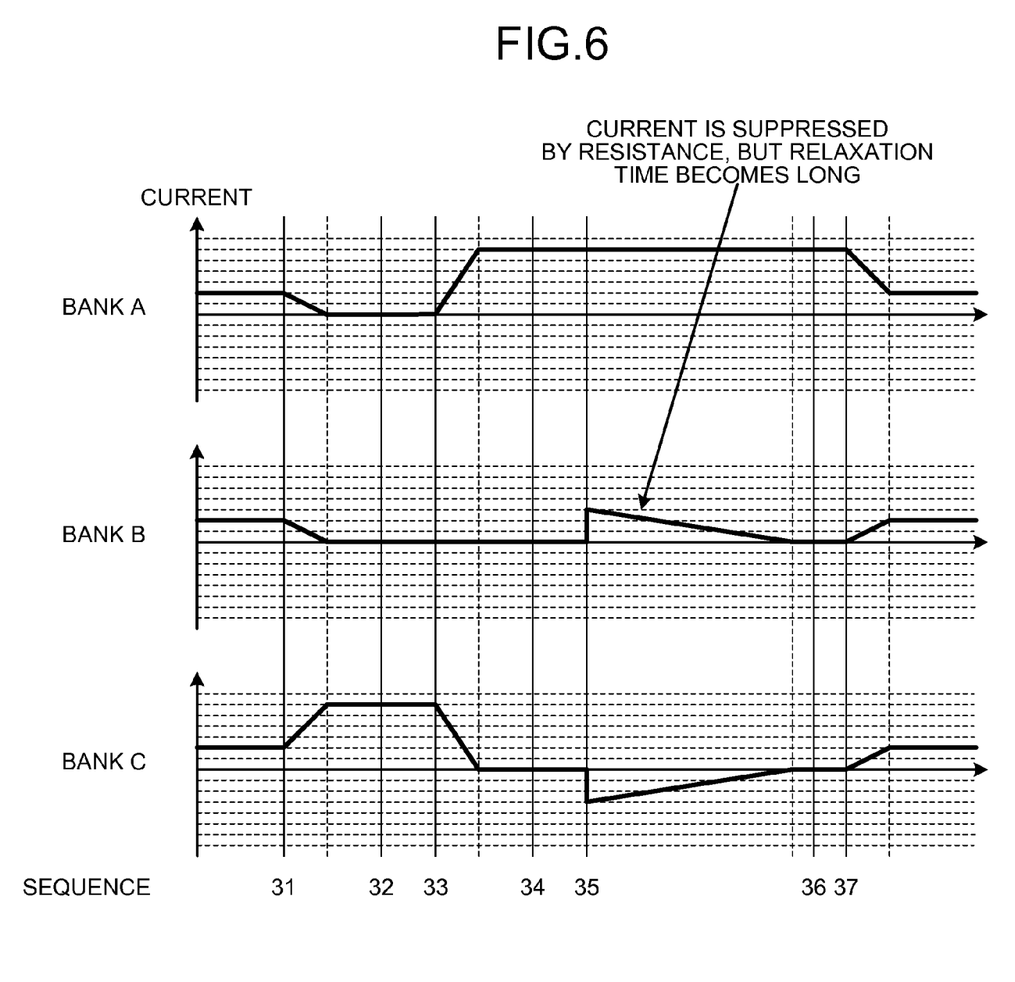
FIG. 6 is a time chart illustrating a state of respective banks according to the third method.

FIG. 6 is a time chart illustrating a state of respective banks according to the third method. In the third method, operations by the following sequences are performed.

(1) First, the DCDC1 is shut down, and the current to the DCDC2 is increased to maintain the output of the system (sequence 31).

(2) The switch Ba is then switched to a neutral position (a position where the switch Ba is not connected to any contact) (sequence 32).

(3) The DCDC2 is then shut down, and the current to the DCDC1 is increased so as to maintain the output of the system (sequence 33).

The sequences up to this point are the same as those of the second method.

(4) The opening/closing switch Bb is then opened to connect the bank B and the switch Ba via the resistance (sequence 34).

(5) The switch Ba is then switched to the bus 2 (the contact L) side to connect the bank 2 to the bus 2 (sequence 35).

(6) The opening/closing switch Bb is then closed after waiting until the banks B and C are balanced, in other words, until the current of the bank B is stabilized (sequence 36).

(7) Lastly, the output of the DCDC2 is increased and the output of the DCDC1 is decreased to return to the normal operation mode (sequence 37).

Operations according to the third method are explained with reference to the time chart shown in FIG. 6. Because the sequences 31 to 33 are the same as those of the second method, explanations thereof are omitted. Note that after the control executed by the sequence 33, as shown in FIG. 6, the current of 6 units is flowing only to the bank A.

The sequence 34 is a preparation operation for the sequence 35, and the bank B and the switch Ba are connected via the resistance. In the sequence 35, the switch Ba is connected to the bus 2, so that the current shown in FIG. 6 flows to the bank B. In an example of FIG. 6, a discharge current of 3 units flows to the bank B, and a charge current of 3 units flows to the bank C. Because the cross current generated at this time flows via the resistance, the cross current is smaller and a relaxation time becomes longer than in the case of the second method.

In the sequence 36, the opening/closing switch Bb is closed after waiting until the cross current generated in the sequence 35 has decreased. Even when the opening/closing switch Bb is closed, because the cross current has been relaxed, there is little change in the current flowing to the respective banks.

In the sequence 37, the output of the DCDC2 is increased and the output of the DCDC1 is decreased, so that the current flowing to the bank A decreases and the current flowing to the banks B and C increases. As a result, the banks A to C share the current, and a discharge current of 2 units flows to the respective banks.

According to the third method, because the bank is connected to the bus via the resistance at the time of connecting of the bank, the cross current can be made smaller than that of the first and second methods.

According to the third method, the sequences when the number of buses and DC-DC converters are two have been explained; but, the same sequences can be used when the number thereof is three or more. For example, the operation of the first DC-DC converter, which is the DC-DC converter as the connection source electrically connected with the first battery bank to be switched, is stopped, and the operating current of at least one of the DC-DC converters other than the first DC-DC converter is increased to maintain the output of the system; the first switch connected with the first battery bank is then switched to a neutral position; the operation of the second DC-DC converter, which is the DC-DC converter as a switching destination, is stopped, and the operating current of at least one of the DC-DC converters other than the second DC-DC converter is increased to maintain the output of the system; the first opening/closing switch connected with the first battery bank is opened to connect the first battery bank and the first switch via the resistance; the first switch is then switched to be electrically connected to the second DC-DC converter; and after waiting until the current flowing to the first battery bank is stabilized, the first opening/closing switch is closed, so that the operating current of the DC-DC converters including the first and second DC-DC converters is returned back to the state before switching.

(Fourth Method)

Figure 7:
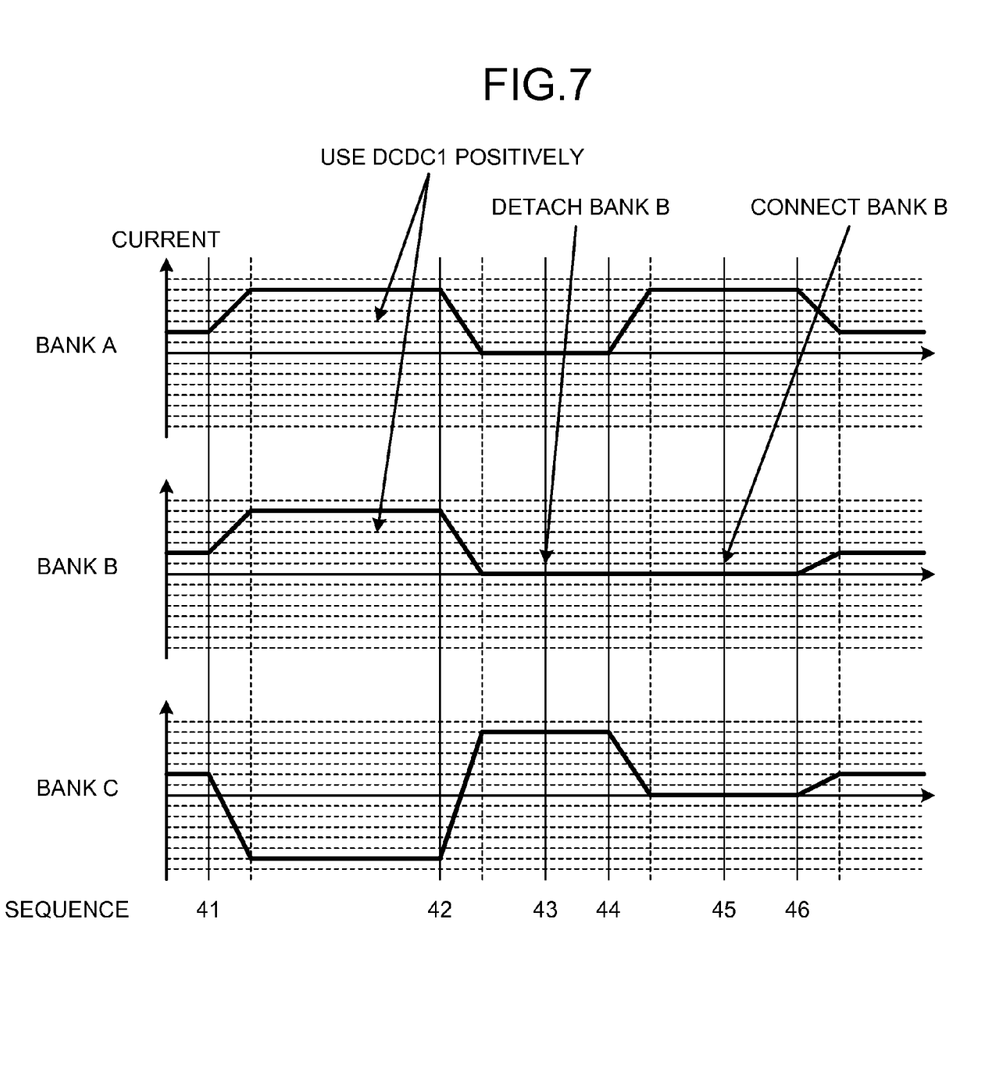
FIG. 7 is a time chart illustrating a state of respective banks according to a fourth method.

FIG. 7 is a time chart illustrating a state of respective banks according to a fourth method. In the fourth method, operations by the following sequences are performed. The system configuration is identical to that shown in FIG. 2.

(1) First, the output of the DCDC1 is increased to decrease the SOC of the bank connected to the bus 1 (sequence 41).

(2) The DCDC1 is then shut down, and the current to the DCDC2 is increased to maintain the output of the system (sequence 42).

(3) The switch Ba is then switched to a neutral position (a position where the switch Ba is not connected to any contact) (sequence 43).

(4) Subsequently, waiting until the open-circuit-voltage (voltage of battery bank with no current) of the bank C becomes equal to the voltage of the bank B, the output of the DCDC1 is increased at the moment when these voltages become equal, and the DCDC2 is shut down (sequence 44).

(5) The switch Ba is then switched to the bus 2 (the contact L) side so as to connect the bank B to the bus 2 (sequence 45).

(6) Lastly, the output of the DCDC2 is increased and the output of the DCDC1 is decreased to return back to the normal operation mode (sequence 46).

Figure 8:
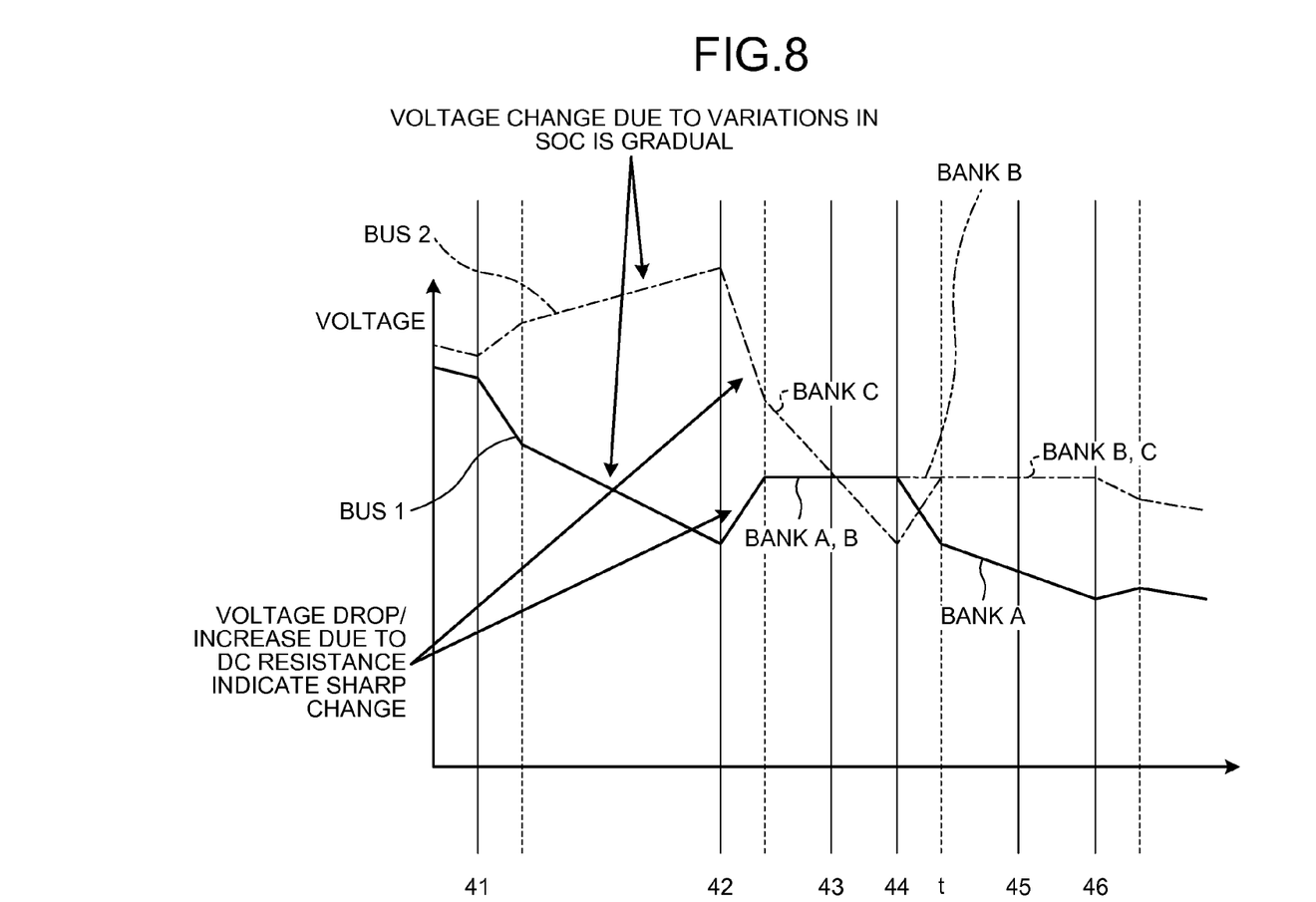
FIG. 8 is a time chart illustrating a voltage change of each bus according to the fourth method.

Operations according to the fourth method are explained with reference to FIG. 8 and the time chart shown in FIG. 7. FIG. 8 is a time chart illustrating a voltage of each bus according to the fourth method. In FIG. 8, a waveform indicated by a solid line denotes a voltage of the bus 1, and a waveform indicated by a one-dot chain line denotes a voltage of the bus 2. First, in the sequence 41, the SOC of the banks A and B connected to the bus 1 is decreased by positively discharging the DCDC1. Generally, the voltage of a battery decreases as the SOC decreases, so that the voltages of the banks A and B connected to the bus 1 become lower than the voltage of the bank C connected to the bus 2. For a more aggressive control, the DCDC2 can perform a charge operation and the output of the DCDC1 can be increased by the charged amount. In FIG. 7, the DCDC2 performs a charge operation of 6 units and the DCDC1 performs a discharge operation of 12 units (6 units for the banks A and B respectively), to maintain a discharge current of 6 units in the entire system.

In the sequence 42, the DCDC1 is shut down and the output of the DCDC2 is increased, so that the bank C is changed from charge to discharge and the current to the banks A and B decreases. As a result, a current of 6 units flows to the bank C, and no current flows to the banks A and B. Because the battery has an internal resistance, the voltage at the time of discharge becomes lower than that at the time of charge in the same SOC. Accordingly, the voltage of the bank C drops due to the sequence 42, and the voltages of the banks A and B increase. However, as shown in FIG. 8, if the SOC of the banks A and B is sufficiently dropped with respect to the SOC of the bank C in the sequence 41, the voltage of the bank C is maintained in a higher than the voltage of the banks A and B even after the sequence 42.

In the sequence 43, the switch Ba is controlled to a neutral position, but the DCDC1 is shut down, so that there is no change in the state of the respective banks. At this time, the voltage of the bank B is measured. This voltage is denoted as V.

In the sequence 44, first there is a wait until the open-circuit-voltage of the bank C becomes equal to the voltage V of the bank B. Because the bank C is discharging, the voltage thereof drops due to the internal resistance of the battery, whose amount of voltage drop can be determined easily by a product of the internal resistance of the bank C and the discharge current. The open-circuit-voltage of the bank C is obtained by adding the amount of voltage drop due to the internal resistance to the voltage of the bank C. When the open-circuit-voltage of the bank C becomes equal to the voltage of the bank B, the output of the DCDC1 is increased and the DCDC2 is shut down, so that the current flowing to the bank A increases and the current flowing to the bank C decreases. As a result, a current of 6 units flows to the bank A, and no current flows to the banks B and C. At this time, the voltage of the bank B and the voltage of the bank C become the same.

In the sequence 45, the switch Ba is connected to the bus 2. The bank C is connected to the bus 2, but the voltage of the bank B and the voltage of the bank C become the same as a result of the sequence 44, so that the cross current does not flow between the bank B and the bank C.

In the sequence 46, the output of the DCDC2 is increased and the output of the DCDC1 is decreased, so that the current flowing to the bank A decreases and the current flowing to the bank B and the bank C increases. As a result, the banks A to C share the current, and the discharge current of 2 units flows to the respective banks.

As described above, according to the fourth method, the cross current at the time of disconnecting and connecting the bank can be suppressed and thus power is not consumed for balancing the banks, which is an advantageous effect thereof.

In FIG. 8, a two-dot chain line drawn between a point in time when the sequence 44 is performed and a time t when the voltage of the bank B becomes the open-circuit-voltage of the bank C indicates the voltage of the bank B. As described above, the bank B is disconnected from the bus in the sequence 43 and the DCDC1 is released from the shutdown in the sequence 44, which makes thus the voltage of the bank B and the voltage of the bus 1 different.

With regard to the fourth method, the contents explained with reference to FIG. 7 are an explanation of the operation at the time of discharge, the contents of which can be performed in the same procedure also at the time of charge. The more detailed description is as follows.

(1) First, the charge current of the DCDC1 is increased to increase the SOC of the bank connected to the bus 1 (sequence 41').

(2) The DCDC1 is then shut down, and a current amount of the DCDC1 is compensated by the DCDC2 so as to maintain the state before shutdown (sequence 42').

(3) The switch Ba is then switched to a neutral position (a position where the switch Ba is not connected to any contact) (sequence 43').

(4) Subsequently, waiting until the open-circuit-voltage of the bank C becomes equal to the voltage of the bank B, the charge current of the DCDC1 is increased at the moment when these voltages become equal, and the DCDC2 is shut down (sequence 44').

(5) The switch Ba is then switched to the bus 2 (the contact L) side to connect the bank B to the bus 2 (sequence 45').

(6) Lastly, the charge current of the DCDC2 is increased, and the charge current of the DCDC1 is decreased, so as to return back to the normal operation mode (sequence 46').

As described above, according to the charge control by the fourth method, a parallel electricity-storage system that suppresses variations even in an application in which electric power needs to be absorbed continuously such as at the time of electric power regeneration can be realized, which is an advantageous effect thereof.

According to the fourth method, the sequences where the number of buses and DC-DC converters are two have been explained, which can be applied to a case when the number thereof is three or more. For example, the output of the first DC-DC converter, which is the DC-DC converter as the connection source electrically connected with the first battery bank to be switched, is increased, and the SOC of the battery bank electrically connected to the first DC bus connected with the first DC-DC converter is decreased or increased; the operation of the first DC-DC converter is stopped, and the operating current of at least one of the DC-DC converters other than the first DC-DC converter is increased so as to maintain the output of the system; the first switch connected with the first battery bank is then switched to a neutral position; the output of the first DC-DC converter is increased, and the operation of the second DC-DC converter being the DC-DC converter as the switching destination is stopped; waiting until the voltage at the time of shutdown of the second DC bus connected with the second DC-DC converter, which is the open-circuit voltage of the bank connected the second DC bus, becomes equal to the voltage of the first battery bank, the first switch is then switched to the second bus-side so as to connect the first battery bank to the second bus; and the output of the second DC-DC converter is increased, and the output of the first DC-DC converter is decreased.

The first to fourth methods have been explained above as an example of the bank switch control applicable to the parallel electricity-storage system according to the present embodiment. These first to fourth methods can be executed without shutting down the system, and thus the bank switch control can be executed actively. Accordingly, the following effects can be directed.

First, it can be considered to group the banks having similar characteristics and separate and use the buses for each group of the grouped banks. By using the banks having similar characteristics with one bus, degradation of the batteries can be retarded.

Grouping of the banks to be replaced is also effective. After determining the banks to be replaced, these banks are grouped and connected to one bus, and a control is actively executed to discharge through the bus, so that remaining electric power of the bank can be effectively used and an influence on the bank not to be replaced can be reduced, which is an advantageous effect thereof.

Furthermore, when a malfunction occurs in the bank, by disconnecting the malfunctioning bank from the bus, deterioration in the performance of the normal banks due to the operation of the malfunctioning bank can be avoided, and a decrease of the system reliability can be suppressed, which is an advantageous effect thereof.

INDUSTRIAL APPLICABILITY

As described above, the parallel electricity-storage system and the control method thereof according to the present invention are useful as an invention that is capable of suppressing the system from becoming large scale and more expensive even when applied to a high-output system.

REFERENCE SIGNS LIST 1 parallel electricity-storage system
2 ($2_1$, $2_2$, ..., $2_n$) battery bank
3 ($3_1$, $3_2$, ..., $3_n$) switch
4A, 4B bus
5A, 5B converter
6 voltage detector
7 controller
9 load device
12 battery cell

The invention claimed is:
1. A parallel electricity-storage system comprising:
a plurality of DC buses;
a number of battery banks each formed of one battery cell or a plurality of battery cells that are serially connected, the number of battery banks being larger than the number of the DC buses;
a switch provided for each of the battery banks and serially connected to the battery bank to switch connection between the battery bank and each of the DC buses so that one of the DC buses is selected;

a plurality of charge/discharge circuits, the number of charge/discharge circuits being the same as the number of the DC buses, that charge respective battery banks via the DC buses or supply discharged power from the respective battery banks received via the DC buses to a load device;

a plurality of voltage detectors, wherein each voltage detector is associated with a respective battery bank and each voltage detector detects a voltage of the respective battery bank; and a controller that controls the switch based on at least a voltage detected by the voltage detector.

2. The parallel electricity-storage system according to claim 1, further comprising an opening/closing switch connected with a device having a resistance in parallel and inserted between each of the battery banks and each of the switches.

3. A control method of a parallel electricity-storage system that includes battery banks formed of one battery cell or a plurality of battery cells that are serially connected, and a charge/discharge circuit that charges respective battery banks via a DC bus or supplies discharged power from the respective battery banks received via the DC bus to a load device, wherein the parallel electricity-storage system has a configuration in which number of the DC buses in the parallel electricity-storage system is plural, number of the charge/discharge circuits is same as that of the DC buses, number of the battery banks is larger than the number of the DC buses, and a switch provided for each of the battery banks and serially connected to the battery bank to switch connection between the battery bank and each of the DC buses so that one of the DC buses is selected, the control method comprising:

a first step of
stopping an operation of a first charge/discharge circuit being a charge/discharge circuit as a connection source electrically connected with a first battery bank targeted to be switched, and
increasing an operating current of at least one of the charge/discharge circuits other than the first charge/discharge circuit so that an output of the system is maintained;

a second step of switching, by a controller, a first switch connected with the first battery bank to a charge/discharge circuit other than the first charge/discharge circuit so as to be electrically connected; and a third step of returning the operating current of the charge/discharge circuits including the first charge/discharge circuit back to that in a state before having been switched.

4. The control method of a parallel electricity-storage system according to claim 3, comprising: between the first step and the second step, a first substep of switching the first switch to a neutral position; and a second substep of
stopping an operation of a second charge/discharge circuit being a charge/discharge circuit as a switching destination, and
increasing an operating current of at least one of the charge/discharge circuits other than the second charge/discharge circuit so as to maintain the output of the system.

5. The control method of a parallel electricity-storage system according to claim 4, wherein the parallel electricity-storage system is configured further to include opening/closing switches,
each of which being connected with each resistances in parallel and
each of which being inserted between each of the battery banks and each of the switches, the control method further comprising:

a third substep, between the second substep and the second step, of blocking the first opening/closing switch connected with the first battery bank and connecting the first battery bank and the first switch via a device having a resistance; and a fourth substep, between the second step and the third step, at which the first opening/closing switch is closed after a current flowing to the first battery bank is stabilized.

6. The control method of a parallel electricity-storage system according to claim 3, wherein battery banks having similar characteristics are grouped and the DC buses are selected and used for each group of the grouped battery banks.

7. The control method of a parallel electricity-storage system according to claim 3, wherein battery banks to be replaced are grouped and the DC buses are selected and used for each group of the grouped battery banks.

8. A control method of a parallel electricity-storage system that includes battery banks formed of one battery cell or a plurality of battery cells that are connected serially, and a charge/discharge circuit that charges respective battery banks via a DC bus or supplies discharged power from the respective battery banks received via the DC bus to a load device, wherein the parallel electricity-storage system has a configuration in which number of the DC buses in the parallel electricity-storage system is plural, number of the charge/discharge circuits is same as that of the DC buses, number of the battery banks is provided larger than the number of the DC buses, and a switch provided for each of the battery banks and serially connected to the battery bank to switch connection between the battery bank and each of the DC buses so that one of the DC buses is selected, the control method comprises:

a first step of
increasing an output of a first charge/discharge circuit being a charge/discharge circuit as a connection source electrically connected with a first battery bank targeted to be switched, and
decreasing a SOC of a battery bank electrically connected to a first DC bus connected with the first charge/discharge circuit;

a second step of stopping an operation of the first charge/discharge circuit and increasing an operating current of at least one of the charge/discharge circuits other than the first charge/discharge circuit so as to maintain an output of the system;

a third step of switching, by a controller, a first switch connected with the first battery bank to a neutral position;

a fourth step of
waiting until a voltage at a time of shutdown of a second DC bus being a charge/discharge circuit as a switching destination connected with the second charge/discharge circuit becomes equal to a voltage of the first battery bank, and thereafter,
increasing an output of the first charge/discharge circuit, and stopping an operation of the second charge/discharge circuit;
a fifth step of switching the first switch to the second bus side so as to input the first battery bank to the second bus; and
a sixth step of increasing an output of the second charge/discharge circuit, and decreasing the output of the first charge/discharge circuit.

* * * * *